United States Patent
Lee et al.

(10) Patent No.: US 12,267,893 B2
(45) Date of Patent: Apr. 1, 2025

(54) METHOD AND APPARATUS FOR CONTROL SL BSR BASED ON DIFFERENT DIRECT LINKS IN SIDELINK COMMUNICATION SYSTEM

(71) Applicant: LG ELECTRONICS INC., Seoul (KR)

(72) Inventors: Youngdae Lee, Seoul (KR); Giwon Park, Seoul (KR); Jongyoul Lee, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 495 days.

(21) Appl. No.: 17/439,694

(22) PCT Filed: Apr. 29, 2020

(86) PCT No.: PCT/KR2020/005765
§ 371 (c)(1),
(2) Date: Sep. 15, 2021

(87) PCT Pub. No.: WO2020/222563
PCT Pub. Date: Nov. 5, 2020

(65) Prior Publication Data
US 2022/0167441 A1    May 26, 2022

Related U.S. Application Data

(60) Provisional application No. 62/842,467, filed on May 2, 2019.

(51) Int. Cl.
*H04W 76/14*    (2018.01)
*H04W 28/02*    (2009.01)
*H04W 76/19*    (2018.01)

(52) U.S. Cl.
CPC ....... *H04W 76/14* (2018.02); *H04W 28/0268* (2013.01); *H04W 28/0278* (2013.01); *H04W 76/19* (2018.02)

(58) Field of Classification Search
None
See application file for complete search history.

(56) References Cited

U.S. PATENT DOCUMENTS 11,838,936 B2 * 12/2023 Kung ..................... H04W 72/54
11,844,133 B2 * 12/2023 Kim ........................ H04W 76/19
(Continued)

OTHER PUBLICATIONS

Apple, Discussion on SL RLM/RLF declaration, R2-1903692, 3GPP TSG-RAN2 Meeting #105b, Xi'an, China, Mar. 29, 2019, section 2; and figure 1a.
Interdigital Inc., AS-Level Link Management for NR V2X, R2-1904221, 3GPP TSG-RAN2 Meeting #105b, Xi'an, China, Mar. 29, 2019, sections 2-3.
Intel Corporation, On SL interface availability for NR V2X, R2-1903659, 3GPP TSG-RAN2 Meeting #105b, Xi'an, China, Mar. 29, 2019, section 2.

(Continued)

*Primary Examiner* — Christopher T Wyllie
(74) *Attorney, Agent, or Firm* — BRYAN CAVE LEIGHTON PAISNER LLP

(57) ABSTRACT

A method and apparatus for control SL BSR based on different direct links in sidelink communication system is provided. A first wireless device establishes a sidelink between a second wireless device. A first wireless device triggers a sidelink (SL) buffer status report (BSR) based on data available for transmission via the sidelink. A first wireless device detects a failure on the sidelink. A first wireless device cancels the triggered SL BSR based on the failure on the sidelink.

13 Claims, 19 Drawing Sheets

(56) References Cited

U.S. PATENT DOCUMENTS

| | | | |
|---|---|---|---|
| 11,917,641 B2* | 2/2024 | Lee | H04W 72/23 |
| 2016/0044737 A1* | 2/2016 | Kwon | H04W 76/19 |
| | | | 370/328 |
| 2017/0280486 A1* | 9/2017 | Lee | H04W 72/569 |
| 2018/0054755 A1* | 2/2018 | Lee | H04W 72/21 |
| 2019/0053293 A1* | 2/2019 | Akoum | H04W 72/23 |
| 2019/0215756 A1* | 7/2019 | Park | H04W 24/10 |
| 2021/0392716 A1* | 12/2021 | Kim | H04W 72/0453 |
| 2022/0070876 A1* | 3/2022 | Bangolae | H04W 76/27 |
| 2022/0117032 A1* | 4/2022 | Han | H04L 1/08 |
| 2022/0167441 A1* | 5/2022 | Lee | H04W 28/0278 |
| 2022/0174774 A1* | 6/2022 | Tseng | H04W 76/34 |
| 2022/0201731 A1* | 6/2022 | Lee | H04W 72/20 |
| 2023/0070446 A1* | 3/2023 | Lee | H04W 76/10 |

OTHER PUBLICATIONS

Vivo, AS level link management for unicast, R2-1903638, 3GPP TSG-RAN2 Meeting #105b, Xi'an, China, Mar. 29, 2019, sections 2-2.3.
CATT, RLM/RLF declaration in Nr V2X Sidelink, R2-1903179, 3GPP TSG-RAN2 Meeting #105b, Xi'an, China, Mar. 29, 2019, sections 2-2.2.
3GPP TS 23.287 V0.3.0, sections 5.2 and 5.6.
3GPP TS 36.322 V15.1.0, section 4.5.
3GPP TS 36.323 V15.3.0, section 4.5.
3GPP TS 36.321 V15.4.0, section 5.14.

* cited by examiner

FIG. 12

Initiating UE                                                                                      Target UE Start T4100  →  DIRECT_COMMUNICATION_REQUEST  →

Stop T4100  ←  DIRECT_COMMUNICATION_ACCEPT  ←
                                                                                                   Start T4108

------------------------------------OR------------------------------------

Start T4100  →  DIRECT_COMMUNICATION_REQUEST  →

Stop T4100  ←  DIRECT_COMMUNICATION_REJECT  ←

… (1)

METHOD AND APPARATUS FOR CONTROL SL BSR BASED ON DIFFERENT DIRECT LINKS IN SIDELINK COMMUNICATION SYSTEM

This application is the National Stage filing under 35 U.S.C. 371 of International Application No. PCT/KR2020/005765 filed on Apr. 29, 2020, which claims priority to U.S. Provisional Application No. 62/842,467 filed on May 2, 2019, the contents of which are all hereby incorporated by reference herein in their entirety.

TECHNICAL FIELD

The present disclosure relates to a method and apparatus for control SL BSR based on different direct links in sidelink communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

For LTE Sidelink, a wireless device manages transmission of a Sidelink BSR for all SL data transmissions. When a Sidelink BSR is transmitted, the wireless device cancels all triggered SL BSRs.

However, since a wireless device performs sidelink transmissions to several wireless devices or for several services, the wireless device may delay transmission of SL data for some wireless devices or for some services due to cancellation of all Sidelink BSR according to the mechanisms used for LTE sidelink.

In addition, if sidelink transmission has a problem, transmission of the SL BSR will result in unnecessary SL grant from the network.

Therefore, studies for control SL BSR based on different direct links in sidelink communication system is needed.

In an aspect, a method performed by a first wireless device in a wireless communication system is provided. A first wireless device establishes a sidelink between a second wireless device. A first wireless device triggers a sidelink (SL) buffer status report (BSR) based on data available for transmission via the sidelink. A first wireless device detects a failure on the sidelink. A first wireless device cancels the triggered SL BSR based on the failure on the sidelink.

In another aspect, a first wireless device in a wireless communication system is provided. A first wireless device includes a transceiver, a memory, and at least one processor operatively coupled to the transceiver and the memory. The at least one processor is configured to establish a sidelink between a second wireless device. The at least one processor is configured to trigger a sidelink (SL) buffer status report (BSR) based on data available for transmission via the sidelink. The at least one processor is configured to detect a failure on the sidelink. The at least one processor is configured to cancel the triggered SL BSR based on the failure on the sidelink.

The present disclosure can have various advantageous effects.

According to some embodiments of the present disclosure, a wireless device could control SL BSR efficiently in sidelink communication system.

For example, a wireless device may cancel all triggered SL BSRs only associated with a single direct link in a certain condition.

For example, a wireless device may avoid unnecessary transmission of SL BSR.

For example, a wireless device could perform sidelink transmission to several other wireless devices efficiently by allocating SL resources.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 12 shows an example of PC5 link setup to which implementations of the present disclosure is applied.

DESCRIPTION

Figure 1:
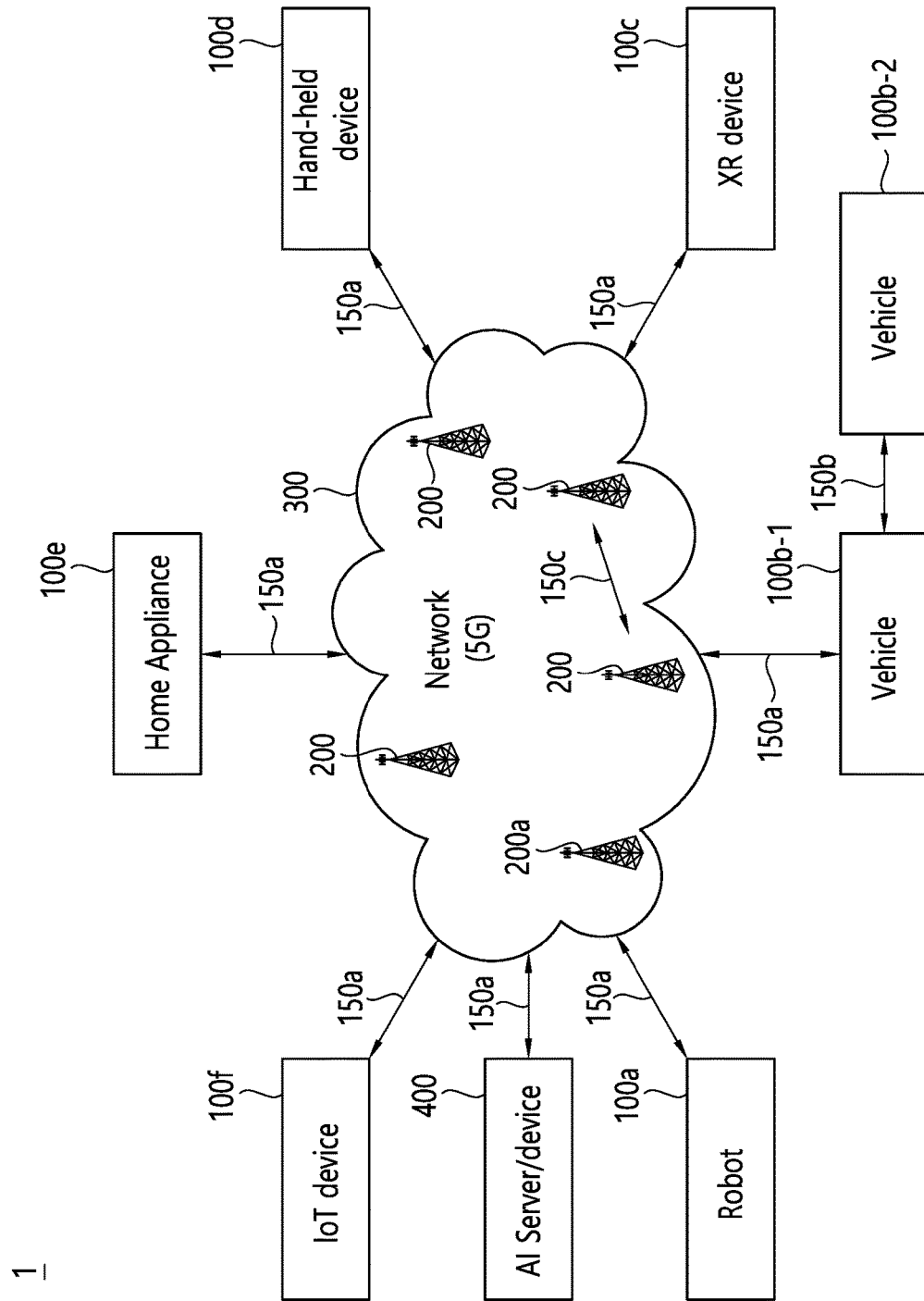
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e g , channel encoding/decoding, modulation/demodulation, and resource mapping/de-mapping), and resource allocating processes, for transmitting/receiving radio signals, may be performed based on the various proposals of the present disclosure.

Figure 2:
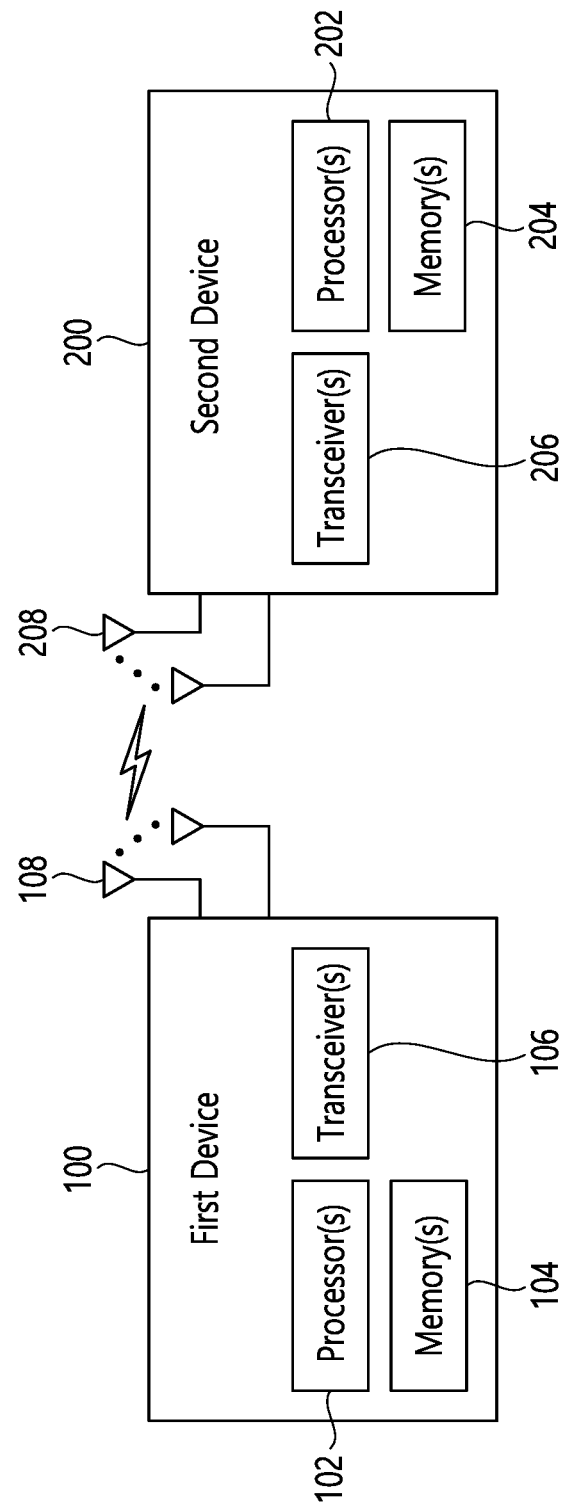
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
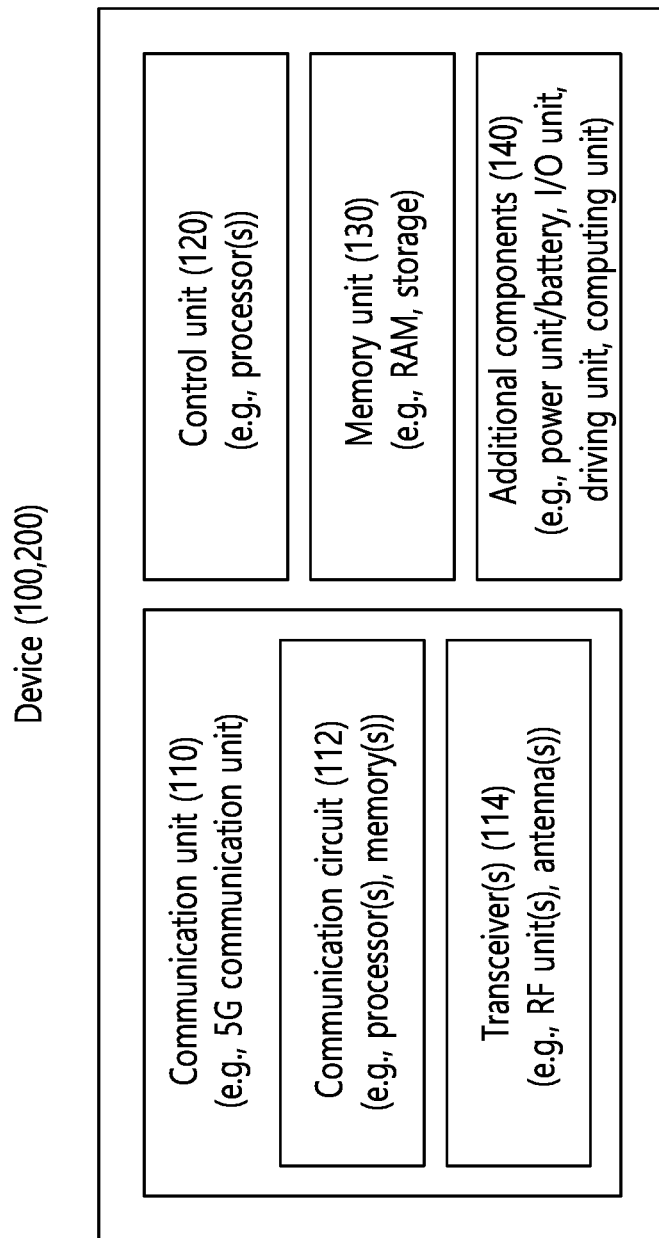
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG.

1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
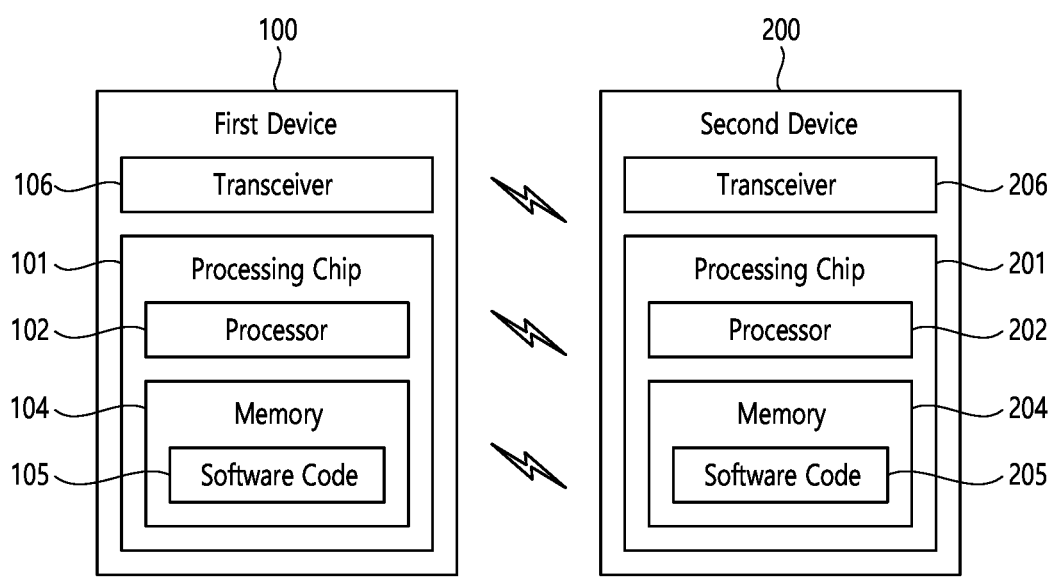
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
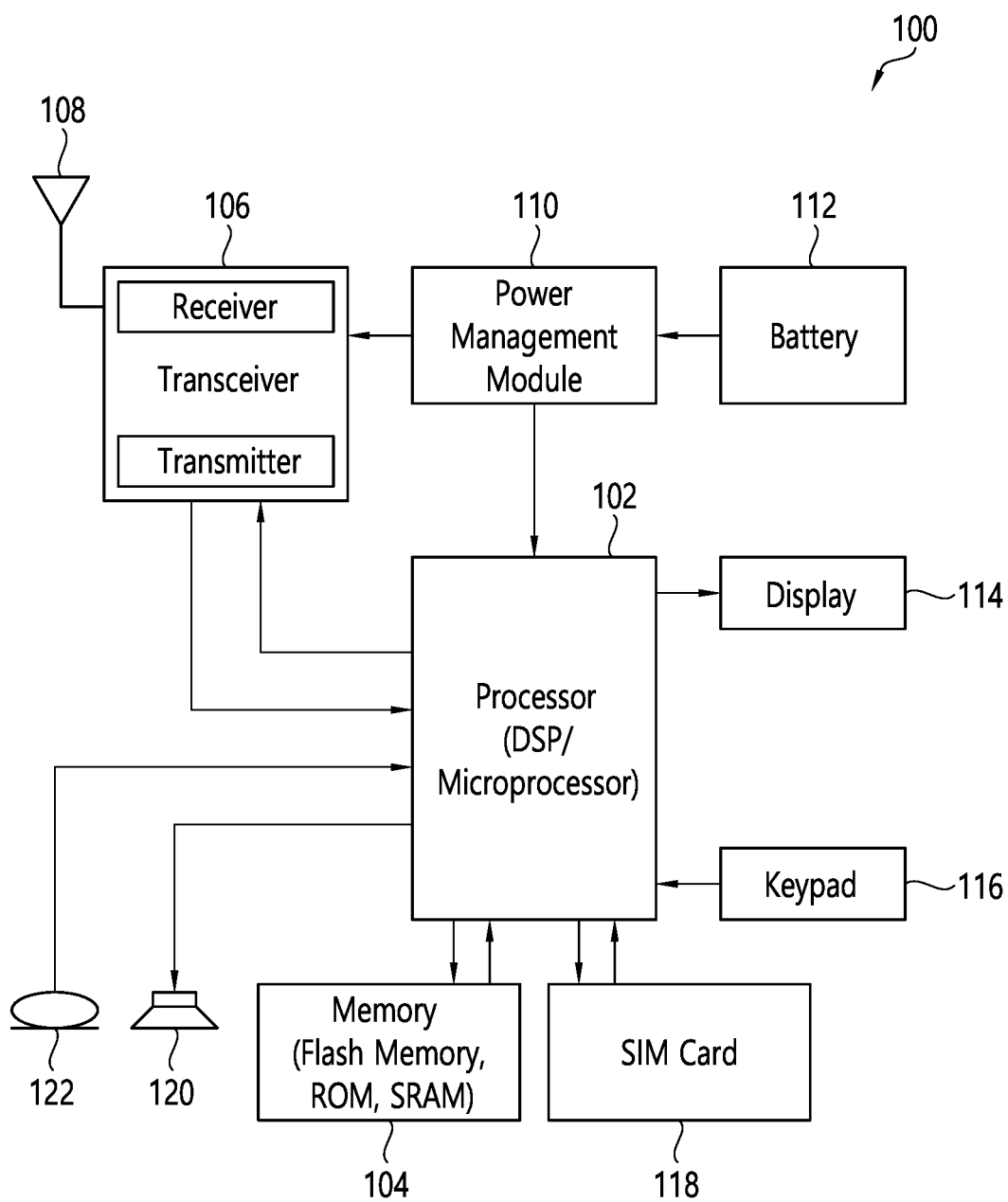
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Hereinafter, an apparatus for control SL BSR based on different direct links in sidelink communication system, according to some embodiments of the present disclosure, will be described.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to establish a sidelink between a second wireless device. The processor 102 may be configured to trigger a sidelink (SL) buffer status report (BSR) based on data available for transmission via the sidelink. The processor 102 may be configured to detect a failure on the sidelink. The processor 102 may be configured to cancel the triggered SL BSR based on the failure on the sidelink.

Hereinafter, a processor for control SL BSR based on different direct links in sidelink communication system, according to some embodiments of the present disclosure, will be described.

The processor may be configured to control the wireless device to establish a sidelink between a second wireless device. The processor may be configured to control the wireless device to trigger a sidelink (SL) buffer status report (BSR) based on data available for transmission via the sidelink. The processor may be configured to control the wireless device to detect a failure on the sidelink. The processor may be configured to control the wireless device to cancel the triggered SL BSR based on the failure on the sidelink.

Hereinafter, a non-transitory computer-readable medium has stored thereon a plurality of instructions for control SL BSR based on different direct links in sidelink communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to establish a sidelink between a second wireless device. The stored a plurality of instructions may cause the wireless device to trigger a sidelink (SL) buffer status report (BSR) based on data available for transmission via the sidelink. The stored a plurality of instructions may cause the wireless device to detect a failure on the sidelink. The stored a plurality of instructions may cause the wireless device to cancel the triggered SL BSR based on the failure on the sidelink.

Figure 6:
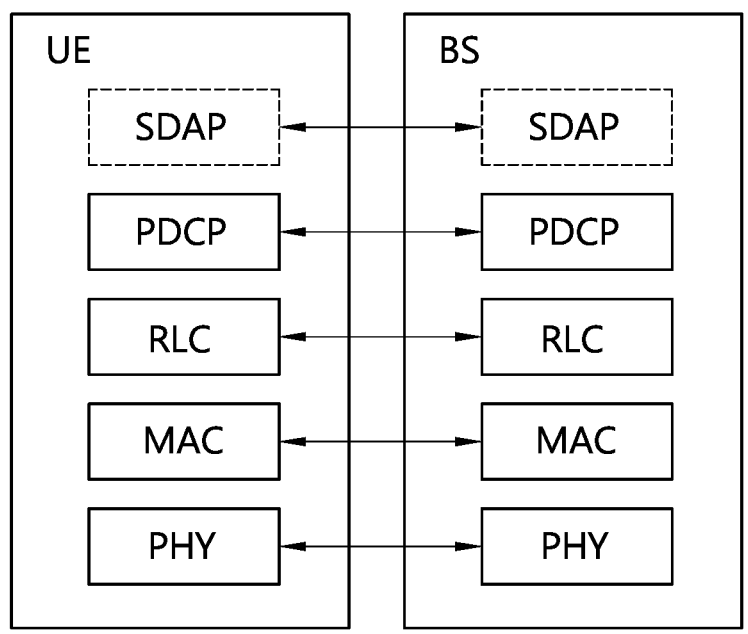
FIGS. 6 and 7 show an example of protocol stacks in a 3GPP based wireless communication system to which implementations of the present disclosure is applied.
Figure 7:
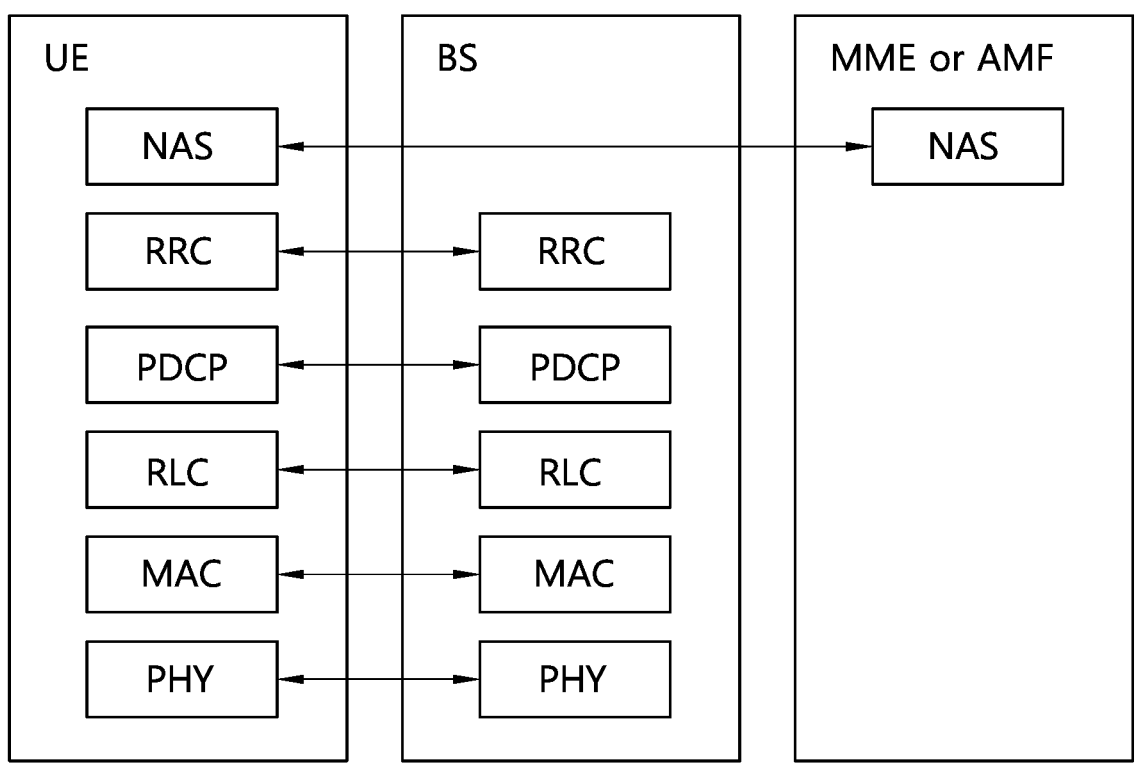

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
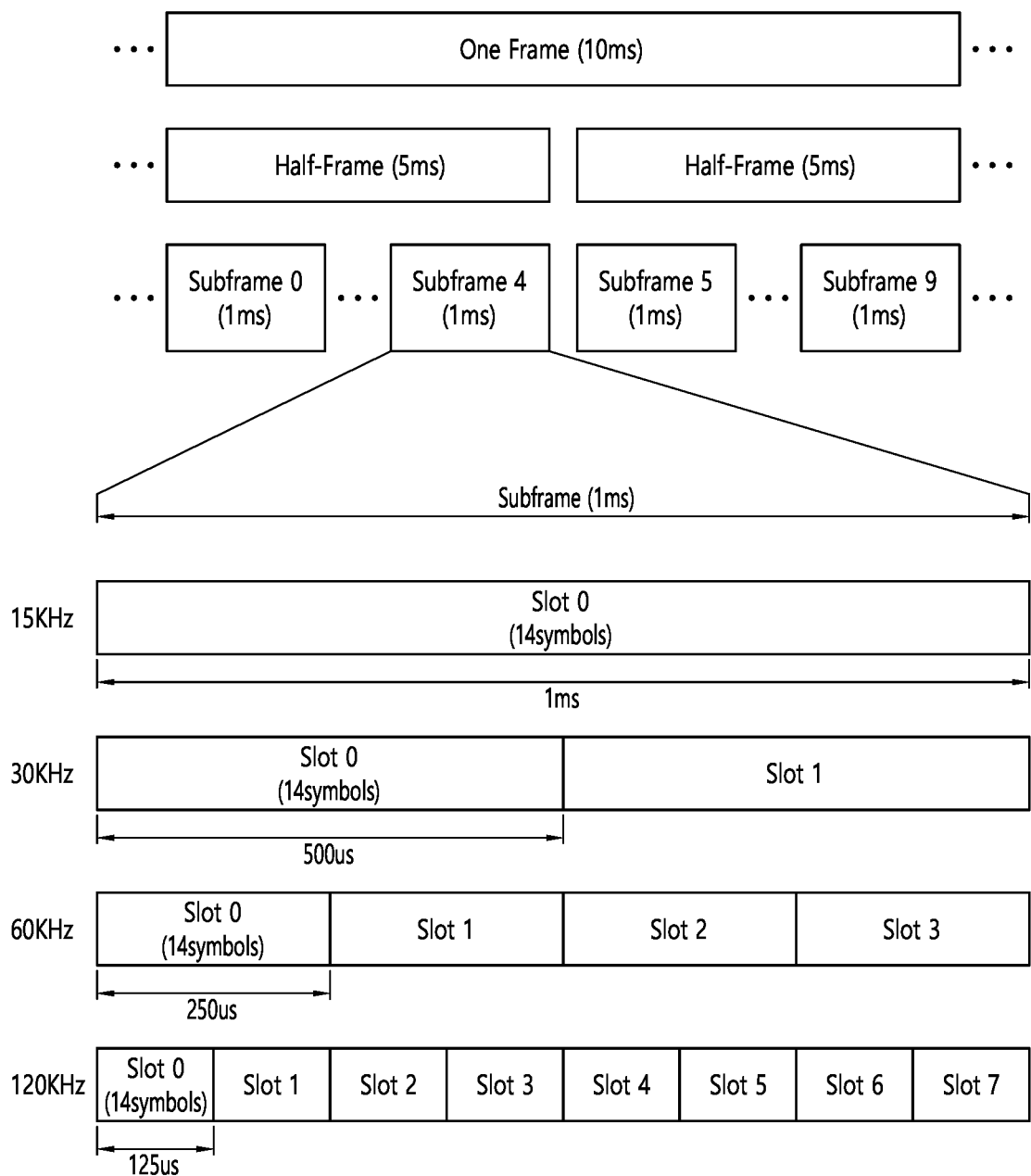
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |

TABLE 1-continued

| u | $N^{slot}_{symb}$ | $N^{frame,u}_{slot}$ | $N^{subframe,u}_{slot}$ |
|---|---|---|---|
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
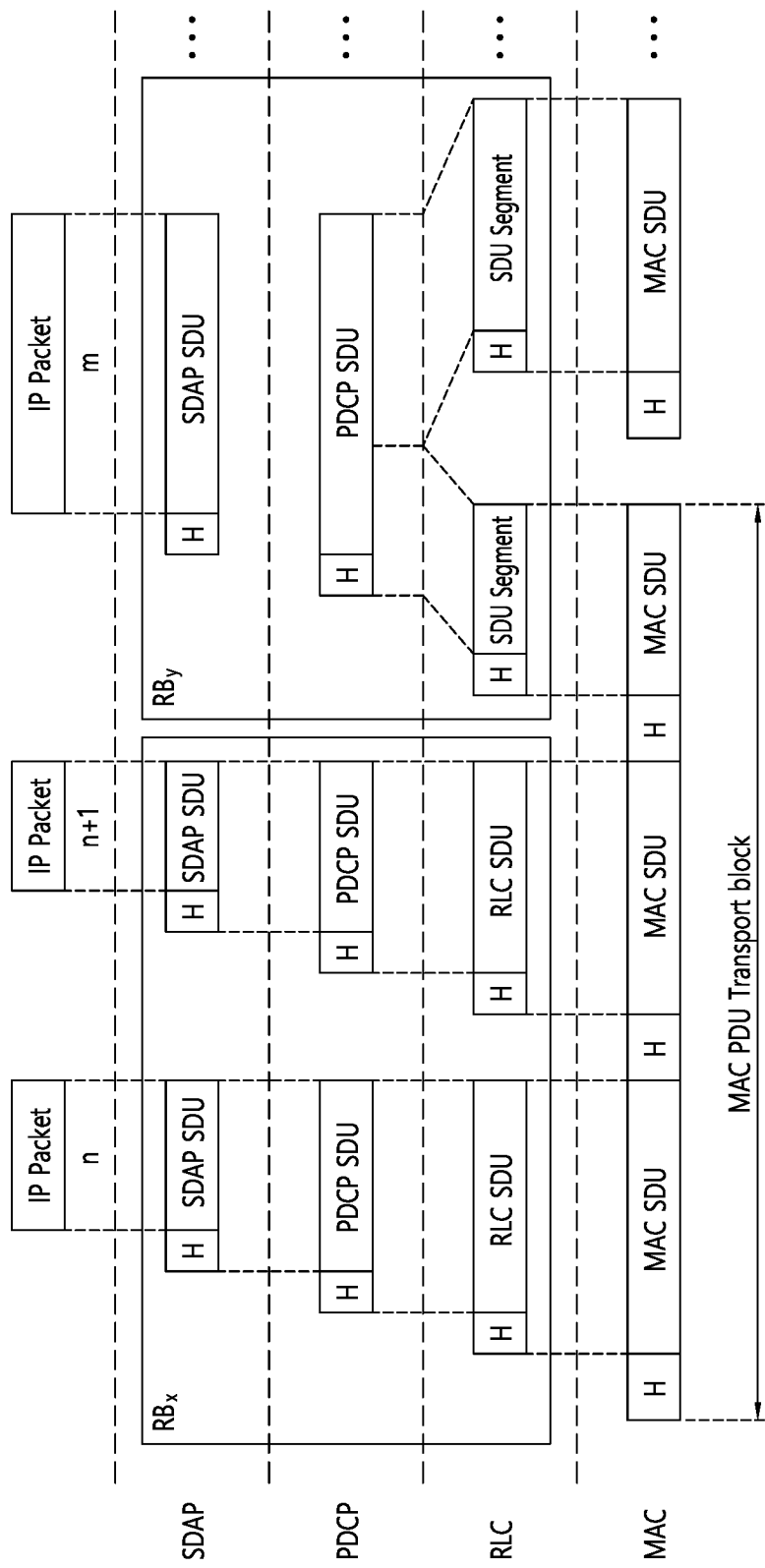
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
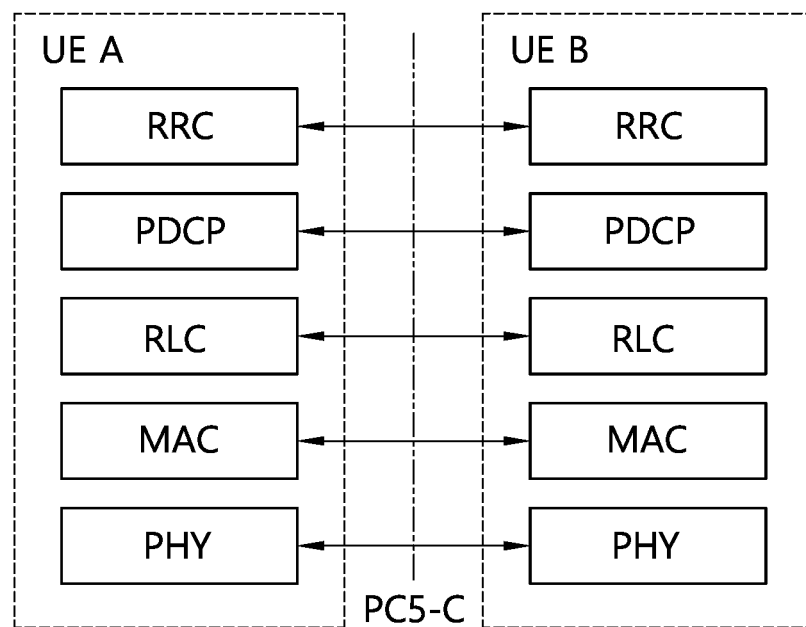
FIGS. 10 and 11 show an example of PC5 protocol stacks to which implementations of the present disclosure is applied.
Figure 11:
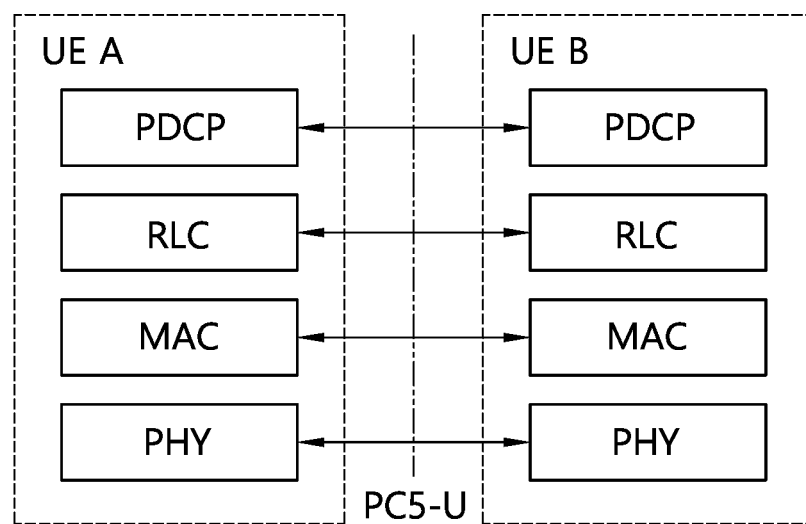

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID

Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:

a) UE autonomously selects SL resource for transmission b) UE assists SL resource selection for other UE(s)

c) UE is configured with NR configured grant (Type-1 like) for SL transmission d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions

SL measurements

Detection of SL transmissions

The following aspects may be considered for SL resource selection:

How a UE selects resource for PSCCH and physical sidelink shared channel (PSSCH) transmission (and other SL physical channel/signals that are defined)

Which information is used by UE for resource selection procedure

Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:

Scheduling UE is configured by gNB

Application layer or pre-configuration selects scheduling UE

Receiver UE schedules transmissions of the transmitter UE during the session

Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

FIG. 12 shows an example of PC5 link setup to which implementations of the present disclosure is applied.

Referring to FIG. 12, an initiating UE transmits a direct communication request message to a target UE for PC5 link setup. Upon transmitting the direct communication request message, the timer T4100 may start. Upon receiving the direct communication request message from the initiating UE, the target UE transmits a direct communication accept message to the initiating UE in response to the direct communication request message. Upon transmitting the direct communication accept message, the timer T4108 may start. Upon receiving the direct communication accept message from the target UE, PC5 link can be established successfully, upon which the timer T4100 may stop.

Alternatively, referring to FIG. 12, an initiating UE transmits a direct communication request message to a target UE for PC5 link setup. Upon transmitting the direct communication request message, the timer T4100 may start. Upon receiving the direct communication request message from the initiating UE, the target UE transmits a direct communication reject message to the initiating UE in response to the direct communication request message. Upon receiving the direct communication reject message from the target UE, PC5 link setup procedure may stop, upon which the timer T4100 may stop.

Figure 13:
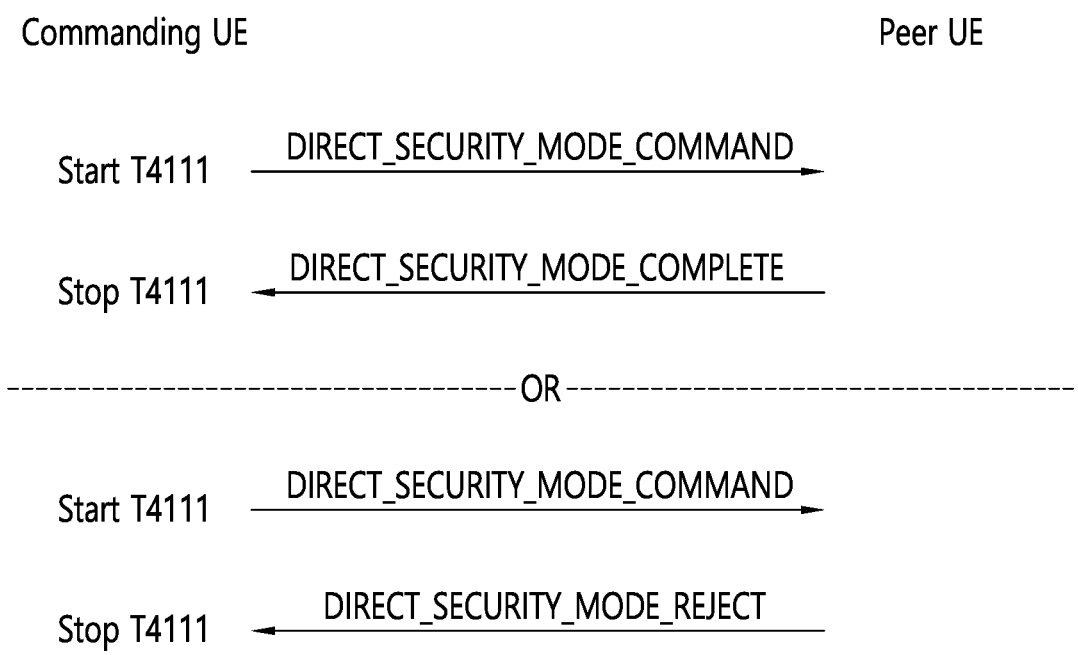
FIG. 13 shows an example of security mode control to which implementations of the present disclosure is applied.

FIG. 13 shows an example of security mode control to which implementations of the present disclosure is applied.

Referring to FIG. 13, a commanding UE transmits a direct security mode command message to a peer UE for security mode control. Upon transmitting the direct security mode command message, the timer T4111 may start. Upon receiving the direct security mode command message from the commanding UE, the peer UE transmits a direct security mode complete message to the commanding UE in response to the direct security mode command message. Upon receiving the direct security mode complete message from the peer UE, security mode can be controlled successfully, upon which the timer T4111 may stop.

Alternatively, referring to FIG. 13, a commanding UE transmits a direct security mode command message to a peer UE for security mode control. Upon transmitting the direct security mode command message, the timer T4111 may start. Upon receiving the direct security mode command message from the commanding UE, the peer UE transmits a direct security mode reject message to the commanding UE in response to the direct security mode command message. Upon receiving the direct security mode reject message from the peer UE, security mode control procedure may stop, upon which the timer T4111 may stop.

Figure 14:
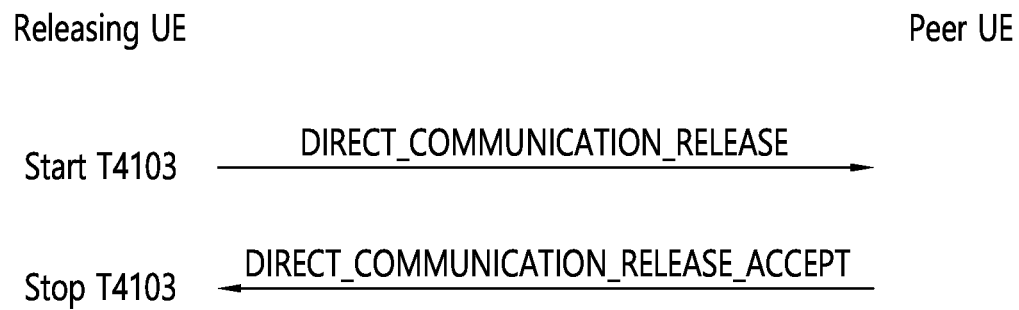
FIG. 14 shows an example of PC5 link release to which implementations of the present disclosure is applied.

FIG. 14 shows an example of PC5 link release to which implementations of the present disclosure is applied.

Referring to FIG. 14, a releasing UE transmits a direct communication release message to a peer UE for PC5 link release. Upon transmitting the direct communication release message, the timer T4103 may start. Upon receiving the direct communication release message from the releasing UE, the peer UE transmits a direct communication release accept message to the releasing UE in response to the direct communication release message. Upon receiving the direct communication release accept message from the peer UE, PC5 link can be released successfully, upon which the timer T4103 may stop.

A wireless device supporting sidelink communication can perform sidelink transmission and reception. In NR V2X, one wireless device can establish a PC5 link (for example, one-to-one connection or session between wireless devices) for one or more unicast services with another wireless device.

PC5 Signalling Protocol above RRC layer in the wireless devices can be used for unicast link establishment and management so that the wireless devices may exchange PC5 signalling (for example, upper layer signalling than RRC signalling) to successfully or unsuccessfully establish a unicast link with security activation or release the established unicast link for a unicast or groupcast session.

Hereinafter, V2X communication over PC5 reference point is described. It may be referred to as Section 5.2 of 3GPP TS 23.287 v0.3.0.

For V2X communication, two types of PC5 reference points exist: the LTE based PC5 reference point and the NR based PC5 reference point. A UE may use either type of PC5 or both for V2X communication depending on the services the UE supports. The V2X communication over PC5 reference point supports roaming and inter-PLMN operations. V2X communication over PC5 reference point is supported when UE is "served by NR or E-UTRA" or when the UE is "not served by NR or E-UTRA".

A UE is authorized to transmit and receive V2X messages when it has valid authorization and configuration.

The V2X communication over PC5 reference point has the following characteristics:

V2X communication over LTE based PC5 reference point is connectionless, i.e. broadcast mode at Access Stratum (AS) layer, and there is no signalling over PC5 for connection establishment.

V2X communication over NR based PC5 reference point supports broadcast mode, groupcast mode, and unicast mode at AS layer. The UE will indicate the mode of communication for a V2X message to the AS layer. Signalling over control plane over PC5 reference point for unicast mode communication management is supported.

V2X services communication support between UEs over PC5 user plane.

V2X messages are exchanged between UEs over PC5 user plane.

Both IP based and non-IP based V2X messages are supported over PC5 reference point.

For IP based V2X messages, only IPv6 is used. IPv4 is not supported.

If the UE has an active emergency PDU Session, the communication over the emergency PDU Session shall be prioritized over V2X communication over PC5 reference point.

Broadcast mode communication over PC5 reference point is described.

Broadcast mode of communication is supported over both LTE based PC5 reference point and NR based PC5 reference point. Therefore, when broadcast mode is selected for transmission over PC5 reference point, PC5 RAT selection needs to be performed.

For LTE based PC5 reference point, broadcast mode is the only supported communication mode.

For NR based PC5 reference point, the broadcast mode also supports enhanced QoS handling.

Groupcast mode communication over PC5 reference point is described.

Groupcast mode of communication is only supported over NR based PC5 reference point.

Unicast mode communication over PC5 reference point is described.

Unicast mode of communication is only supported over NR based PC5 reference point. When Application layer initiates a V2X service which requires PC5 unicast communication, the UE establishes a PC5 unicast link with the corresponding UE.

After successful PC5 unicast link establishment, UE A and UE B use a same pair of Layer-2 IDs for subsequent PC5-S signalling message exchange and V2X service data transmission. V2X layer of the transmitting UE indicates to AS layer whether the message is for PC5-S signalling message (i.e. Direct Communication Accept, Link Layer Identifier Update Request/Response, Disconnect Request/Response) or service data transmission when it sends message over the established PC5 link. V2X layer of receiving UE handles message if it is PC5-S signalling message whilst the V2X layer of receiving UE forwards the message to the upper layer if it is application data message.

The unicast mode supports per-flow QoS model. During the unicast link establishment, each UEs self-assign PC5 Link Identifier and associate the PC5 Link Identifier with the Unicast Link Profile for the established unicast link. The PC5 Link Identifier is a unique value within the UE. The Unicast Link Profile identified by PC5 Link Identifier includes application layer identifier and Layer-2 ID of UE A, application layer identifier and Layer-2 ID of UE B and a set of PC5 QoS Flow Identifier(s) (PFI(s)). Each PFI is associated with QoS parameters (i.e. PQI and optionally Range). The PC5 Link Identifier and PFI(s) are unchanged values for the established unicast link regardless of the change of application layer identifier and Layer-2 ID. The UE uses PFI to indicate the PC5 QoS flow to AS layer, therefore AS layer identifies the corresponding PC5 QoS flow even if the source and/or destination Layer-2 IDs are changed due to e.g. privacy support. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

QoS handling for V2X communication is described. It may be referred to as Section 5.6 of 3GPP TS 23.287 v0.3.0.

For LTE based PC5, the QoS handling is defined, based on ProSe Per-Packet Priority (PPPP) and ProSe Per-Packet Reliability (PPPR).

For NR based PC5, a QoS model similar to that defined for Uu reference point is used, i.e. based on SQIs, with additional parameter of Range. For the V2X communication over NR based PC5 reference point, a QoS flow is associated with a PC5 QoS profile that contains the QoS parameters. A set of standardized PC5 SQIs (PQI) are defined below. The UE may be configured with a set of default PC5 QoS profiles to use for the V2X services. For NR based unicast, groupcast and broadcast PC5 communication, Per-flow QoS model for PC5 QoS management shall be applied.

The following principles apply when the V2X communication is carried over PC5 reference point:

Application layer may set the QoS requirements for the V2X communication, using either PPPP and PPPR model or the PQI and Range model. Depends on the type of PC5 reference point, i.e. LTE based or NR based, selected for the transmission, the UE may map the application layer provided QoS requirements to the suitable QoS parameters to be passed to the lower layer.

When groupcast or unicast mode of V2X communication over NR based PC5 is used, a Range parameter is associated with the QoS parameters for the V2X communication. The Range may be provided by V2X application layer or use a default value mapped from the service type. The Range indicates the minimum distance that the QoS parameters need to be fulfilled. The Range parameter is passed to AS layer together with the QoS parameters for dynamic control.

NR based PC5 supports three types of communication mode, i.e. broadcast, groupcast, and unicast. The QoS handling of these different modes are provided.

The UE may handle broadcast, groupcast, and unicast traffic by taking all their priorities, e.g. indicated by PQIs, into account.

For broadcast and groupcast modes of V2X communication over NR based PC5, standardized PQI values are applied by the UE, as there is no signalling over PC5 reference point for these cases.

When network scheduled operation mode is used, the UE-PC5-AMBR for NR based PC5 applies to all types of communication modes, and is used by NG-RAN for capping the UE's NR based PC5 transmission in the resources management.

PQI is described. A PQI is a special 5QI and is used as a reference to PC5 QoS characteristics, i.e. parameters that control QoS forwarding treatment for the packets over PC5 reference point.

Standardized PQI values have one-to-one mapping to a standardized combination of PC5 QoS characteristics.

PC5 QoS characteristics are described.

This clause specifies the PC5 QoS characteristics associated with PQI. The following characteristics applies, with differences explained in following clauses:

1 Resource Type (GBR, Delay critical GBR or Non-GBR);
2 Priority Level;
3 Packet Delay Budget;
4 Packet Error Rate;
5 Averaging window (for GBR and Delay-critical GBR resource type only);
6 Maximum Data Burst Volume (for Delay-critical GBR resource type only).

Standardized or pre-configured PC5 QoS characteristics, are indicated through the PQI value.

Upper layer may indicate specific PC5 QoS characteristics together with PQI to override the standardized or pre-configured value.

The Priority Level has the same format and meaning as that of the ProSe Per-Packet Priority (PPPP).

The Priority Level shall be used to different treatment of V2X service data across different mode of communication, i.e. broadcast, groupcast, and unicast. In case when all QoS requirements cannot be fulfilled for all the PC5 service data, the Priority Level shall be used to select for which PC5 service data the QoS requirements are prioritized such that a PC5 service data with Priority Level value N is prioritized over PC5 service data with higher Priority Level values, i.e. N+1, N+2, etc. (lower number meaning higher priority).

Identifiers for V2X communication over PC5 reference point is described. It may be referred to as Section 5.6 of 3GPP TS 23.287 v0.3.0.

Each UE has one or more Layer-2 IDs for V2X communication over PC5 reference point, consisting of:
Source Layer-2 ID(s); and
Destination Layer-2 ID(s).

Source and destination Layer-2 IDs are included in layer-2 frames sent on the layer-2 link of the PC5 reference point identifying the layer-2 source and destination of these frames. Source Layer-2 IDs are always self-assigned by the UE originating the corresponding layer-2 frames.

The selection of the source and destination Layer-2 ID(s) by a UE depends on the communication mode of V2X communication over PC5 reference point for this layer-2 link. The source Layer-2 IDs may differ between different communication modes.

When IP-based V2X communication is supported, the UE configures a link local IPv6 address to be used as the source IP address. The UE may use this IP address for V2X communication over PC5 reference point without sending Neighbour Solicitation and Neighbour Advertisement message for Duplicate Address Detection.

If the UE has an active V2X application that requires privacy support in the current Geographical Area, as identified by configuration, in order to ensure that a source UE (e.g. vehicle) cannot be tracked or identified by any other UEs (e.g. vehicles) beyond a certain short time-period required by the application, the source Layer-2 ID shall be changed over time and shall be randomized For IP-based V2X communication over PC5 reference point, the source IP address shall also be changed over time and shall be randomized The change of the identifiers of a source UE must be synchronized across layers used for PC5, e.g. when the application layer identifier changes, the source Layer-2 ID and the source IP address need to be changed.

Data available for transmission in the RLC entity is described. It may be referred to as Section 4.5 of 3GPP TS 36.322 V15.1.0.

For the purpose of MAC buffer status reporting, the UE shall consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as data available for transmission in the RLC layer.

Data available for transmission in the PDCP entity is described. It may be referred to as Section 4.5 of 3GPP TS 36.323 V15.3.0.

For the purpose of MAC buffer status reporting, the UE shall consider PDCP Control PDUs, as well as the following as data available for transmission in the PDCP layer:

For SDUs for which no PDU has been submitted to lower layers:
the SDU itself, if the SDU has not yet been processed by PDCP, or
the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
the SDU, if it has not yet been processed by PDCP, or
the PDU once it has been processed by PDCP.

For radio bearers that are mapped on RLC AM, if the PDCP entity has previously performed the data recovery procedure, the UE shall also consider as data available for transmission in the PDCP layer, all the PDCP PDUs that have only been submitted to re-established AM RLC entity prior to the PDCP data recovery, starting from the first PDCP PDU whose successful delivery has not been confirmed by lower layers, except the PDUs which are indicated as successfully delivered by the PDCP status report, if received.

In addition, for bearers configured with PDCP duplication, when PDCP duplication is activated, for SDUs for which a PDU has only been submitted to lower layers associated with one logical channel, for the purpose of MAC buffer status reporting associated with the other logical channel the UE shall consider:

the PDU, if the PDU has not yet been confirmed to be successfully delivered by those lower layers.

For split bearers, when indicating the data available for transmission to a MAC entity for BSR triggering and Buffer Size calculation, the UE shall:

if ul-DataSplitThreshold is configured and the data available for transmission is larger than or equal to ul-DataSplitThreshold:

indicate the data available for transmission to both the MAC entity configured for SCG and the MAC entity configured for MCG;

else:

if ul-DataSplitDRB-ViaSCG is set to TRUE by upper layer:

indicate the data available for transmission to the MAC entity configured for SCG only;

if ul-DataSplitThreshold is configured, indicate the data available for transmission as 0 to the MAC entity configured for MCG;

else:

indicate the data available for transmission to the MAC entity configured for MCG only;

if ul-DataSplitThreshold is configured, indicate the data available for transmission as 0 to the MAC entity configured for SCG.

For uplink LWA bearers, when indicating the data available for transmission to the MAC entity for BSR triggering and Buffer Size calculation, the UE shall:

if ul-LWA-DataSplitThreshold is configured and the data available for transmission is larger than or equal to ul-LWA-DataSplitThreshold:

indicate the data available for transmission to the MAC entity;

else:

if ul-LWA-DRB-ViaWLAN is set to TRUE by upper layers:

indicate the data available for transmission as 0 to the MAC entity;

else:

indicate the data available for transmission to the MAC entity.

For LWA bearers, only the data that may be sent over LTE (i.e., excluding UL data already sent or decided to be sent over WLAN) is considered as "data available for transmission".

For bearers configured with PDCP duplication, when indicating the data available for transmission to a MAC entity for BSR triggering and Buffer Size calculation, the UE shall:

if PDCP duplication is activated:

indicate the data available for transmission to the MAC entity associated with the primary RLC entity and (if different) the MAC entity associated with the secondary RLC entity.

else:

if the two associated RLC entities belong to the different cell groups:

if ul-DataSplitThreshold is configured and the data available for transmission is larger than or equal to ul-DataSplitThreshold:

indicate the data available for transmission to both the MAC entity configured for SCG and the MAC entity configured for MCG.

else:

if ul-DataSplitDRB-ViaSCG is set to TRUE by upper layer:

indicate the data available for transmission to the MAC entity configured for SCG only;

if ul-DataSplitThreshold is configured, indicate the data available for transmission as 0 to the MAC entity configured for MCG.

else:

indicate the data available for transmission to the MAC entity configured for MCG only;

if ul-DataSplitThreshold is configured, indicate the data available for transmission as 0 to the MAC entity configured for SCG.

else:

indicate the data available for transmission to the MAC entity.

SL-SCH Data transfer is described. It may be referred to as Section 5.14 of 3GPP TS 36.321 v15.4.0.

In order to transmit on the SL-SCH the MAC entity must have at least one sidelink grant.

Sidelink grants are selected as follows for sidelink communication:

if the MAC entity is configured to receive a single sidelink grant dynamically on the PDCCH and more data is available in STCH than can be transmitted in the current SC period, the MAC entity shall:

using the received sidelink grant determine the set of subframes in which transmission of SCI and transmission of first transport block occur;

consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

clear the configured sidelink grant at the end of the corresponding SC Period;

else, if the MAC entity is configured by upper layers to receive multiple sidelink grants dynamically on the PDCCH and more data is available in STCH than can be transmitted in the current SC period, the MAC entity shall for each received sidelink grant:

using the received sidelink grant determine the set of subframes in which transmission of SCI and transmission of first transport block occur;

consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

clear the configured sidelink grant at the end of the corresponding SC Period;

else, if the MAC entity is configured by upper layers to transmit using one or multiple pool(s) of resources and more data is available in STCH than can be transmitted in the current SC period, the MAC entity shall for each sidelink grant to be selected:

if configured by upper layers to use a single pool of resources:
  select that pool of resources for use;
  else, if configured by upper layers to use multiple pools of resources:
  select a pool of resources for use from the pools of resources configured by upper layers whose associated priority list includes the priority of the highest priority of the sidelink logical channel in the MAC PDU to be transmitted;
  If more than one pool of resources has an associated priority list which includes the priority of the sidelink logical channel with the highest priority in the MAC PDU to be transmitted, it is left for UE implementation which one of those pools of resources to select.
    randomly select the time and frequency resources for SL-SCH and SCI of a sidelink grant from the selected resource pool. The random function shall be such that each of the allowed selections can be chosen with equal probability;
    use the selected sidelink grant to determine the set of subframes in which transmission of SCI and transmission of first transport block occur;
    consider the selected sidelink grant to be a configured sidelink grant occurring in those subframes starting at the beginning of the first available SC Period which starts at least 4 subframes after the subframe in which the sidelink grant was selected;
    clear the configured sidelink grant at the end of the corresponding SC Period;
    Retransmissions on SL-SCH cannot occur after the configured sidelink grant has been cleared.
    If the MAC entity is configured by upper layers to transmit using one or multiple pool(s) of resources as, it is left for UE implementation how many sidelink grants to select within one SC period taking the number of sidelink processes into account.
    Buffer Status Reporting is described.
    The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupinfoList. LCG is defined per ProSe Destination.
    A sidelink Buffer Status Report (BSR) shall be triggered if any of the following events occur:
      if the MAC entity has a configured SL-RNTI or a configured SL-V-RNTI:
        SL data, for a sidelink logical channel of a ProSe Destination, becomes available for transmission in the RLC entity or in the PDCP entity (the definition of what data shall be considered as available for transmission is described above) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
        UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
        retx-BSR-TimerSL expires and the MAC entity has data available for transmission for any of the sidelink logical channels, in which case the Sidelink BSR is referred below to as "Regular Sidelink BSR";
        periodic-BSR-TimerSL expires, in which case the Sidelink BSR is referred below to as "Periodic Sidelink BSR";
      else:
        An SL-RNTI or an SL-V-RNTI is configured by upper layers and SL data is available for transmission in the RLC entity or in the PDCP entity (the definition of what data shall be considered as available for transmission is described above), in which case the Sidelink BSR is referred below to as "Regular Sidelink BSR".
    For Regular and Periodic Sidelink BSR:
      if the number of bits in the UL grant is equal to or larger than the size of a Sidelink BSR containing buffer status for all LCGs having data available for transmission plus its subheader:
        report Sidelink BSR containing buffer status for all LCGs having data available for transmission;
      else report Truncated Sidelink BSR containing buffer status for as many LCGs having data available for transmission as possible, taking the number of bits in the UL grant into consideration.
    For Padding Sidelink BSR:
      if the number of padding bits remaining after a Padding BSR has been triggered is equal to or larger than the size of a Sidelink BSR containing buffer status for all LCGs having data available for transmission plus its subheader:
        report Sidelink BSR containing buffer status for all LCGs having data available for transmission;
      else report Truncated Sidelink BSR containing buffer status for as many LCGs having data available for transmission as possible, taking the number of bits in the UL grant into consideration.
    If the Buffer Status reporting procedure determines that at least one Sidelink BSR has been triggered and not cancelled:
      if the MAC entity has UL resources allocated for new transmission for this TTI and the allocated UL resources can accommodate a Sidelink BSR MAC control element plus its subheader as a result of logical channel prioritization:
        instruct the Multiplexing and Assembly procedure to generate the Sidelink BSR MAC control element(s);
        start or restart periodic-BSR-TimerSL except when all the generated Sidelink BSRs are Truncated Sidelink BSRs;
        start or restart retx-BSR-TimerSL;
      else if a Regular Sidelink BSR has been triggered:
        if an uplink grant is not configured:
        a Scheduling Request shall be triggered.
    A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.
    The MAC entity shall restart retx-BSR-TimerSL upon reception of an SL grant.
    All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

Meanwhile, for LTE Sidelink, a wireless device manages transmission of a Sidelink BSR for all SL data transmissions. When a Sidelink BSR is transmitted, the wireless device cancels all triggered SL BSRs.

However, since a wireless device performs sidelink transmissions to several wireless devices or for several services, the wireless device may delay transmission of SL data for some wireless devices or for some services due to cancellation of all Sidelink BSR according to the mechanisms used for LTE sidelink.

In addition, if sidelink transmission has a problem, transmission of the SL BSR will result in unnecessary SL grant from the network.

Therefore, studies for control SL BSR based on different direct links in sidelink communication system is needed.

Hereinafter, a method and apparatus for control SL BSR based on different direct links in sidelink communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 15:
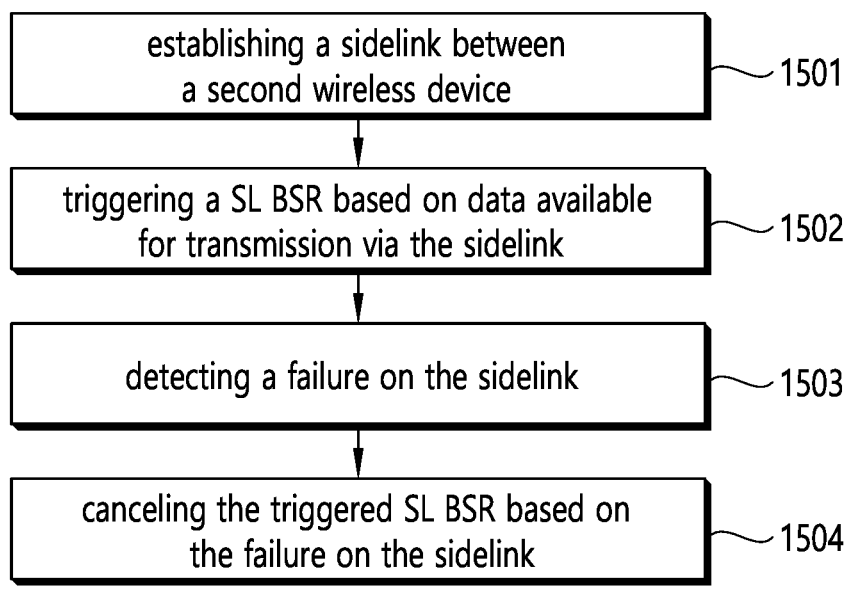
FIG. 15 shows an example of a method for control SL BSR based on different direct links in sidelink communication system, according to some embodiments of the present disclosure.

FIG. 15 shows an example of a method for control SL BSR based on different direct links in sidelink communication system, according to some embodiments of the present disclosure. In particular, FIG. 15 shows an example of a method for performed by a first wireless device.

In step 1501, a first wireless device may establish a sidelink between a second wireless device.

For example, a first wireless device may allocate a first link identifier (ID) to the sidelink between the second wireless device. A first wireless device may indicate, to a network, the allocated link ID for the sidelink. A first wireless device may receive, from the network, configuration for the SL BSR associated with the link ID.

For example, the first link ID may be associated with one or more of Destination IDs and/or one or more of services used by the first wireless device.

For example, a first wireless device may allocate a second link ID to another sidelink between a third wireless device.

For another example, a first wireless device may allocate one link ID to sidelink with one or more of wireless devices. For example, a first wireless device may allocate a specific link ID to a sidelink for groupcast or broad cast with more than one wireless devices.

In step 1502, a first wireless device may trigger a sidelink (SL) buffer status report (BSR) based on data available for transmission via the sidelink.

For example, a wireless device may trigger a SL BSR associated with the first link ID for the sidelink between the second wireless device.

For example, a wireless device may trigger the SL BSR based on one or more logical channels associated with the first link ID have the data available.

For example, a wireless device may trigger a scheduling request (SR) based on that a uplink (UL) grant for the SL BSR is not available.

In step 1503, a first wireless device may detect a failure on the sidelink.

For example, the detecting a failure on the sidelink may further comprise detecting that the sidelink does not meet quality of service (QoS) requirement. For example, the QoS requirement may include a target data rate, a target delay, a target communication range, and/or a target reliability for the destination or the link ID.

For example, the detecting a failure on the sidelink may further comprise detecting that the sidelink between the second wireless device is released.

For example, the detecting a failure on the sidelink may further comprise receiving link failure information from the second wireless device. For example, the link failure information may indicate radio link failure (RLF), retransmission failure, security failure, and/or reconfiguration failure based on transmission from the first wireless device.

In step 1504, a first wireless device may cancel the triggered SL BSR based on the failure on the sidelink.

For example, a first wireless device may cancel the triggered SL BSR associated to the link ID upon detecting a failure related to the link ID.

For example, a first wireless device may cancel the triggered SR based on the failure on the sidelink.

According to some embodiments of the present disclosure, a first wireless device may establish another sidelink between a third wireless device.

For example, a first wireless device may allocate a first link ID to the sidelink between the second wireless device and a second link ID to another sidelink between a third wireless device.

A first wireless device may triggering another SL BSR for the other sidelink based on the data available for transmission via the other sidelink.

For example, a first wireless device may trigger the SL BSR associated with the first link ID and the other SL BSR associated with the second link ID.0

A first wireless device may transmit the other SL BSR for the other sidelink independent from the detected failure on the sidelink.

For example, a first wireless device may cancel the SL BSR associated with the first link ID upon detecting a failure related to the first link ID. On the other hand, the first wireless device may not cancel and transmit the other SL BSR associated with the second link ID independent to the detected failure related to the first link ID. Since, there is no failure related to the second link ID.

According to some embodiments of the present disclosure, the first wireless device is in communication with at least one of a user equipment, a network, or an autonomous vehicle other than the first wireless device.

Figure 16:
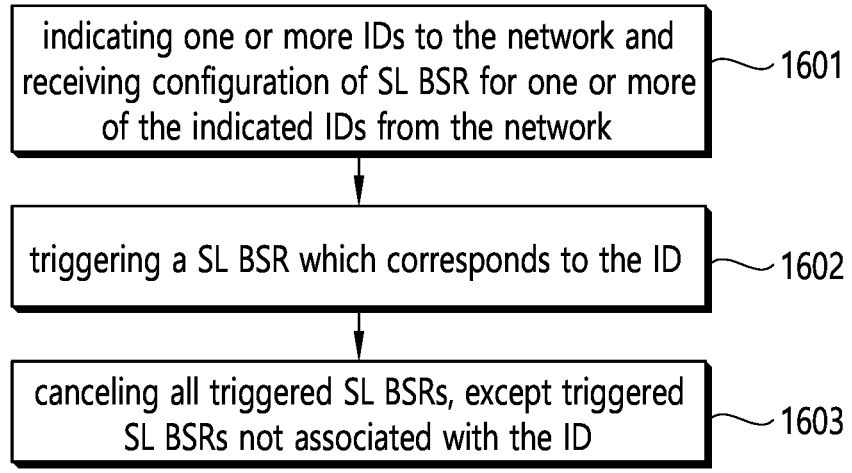
FIG. 16 shows an example of a method for control SL BSR based on different direct links in sidelink communication system, according to some embodiments of the present disclosure.

FIG. 16 shows an example of a method for control SL BSR based on different direct links in sidelink communication system, according to some embodiments of the present disclosure. In particular, FIG. 16 shows an example of method for performing sidelink communication for a UE.

In step 1601, for different sidelink transmissions with different IDs, the UE may indicate one or more IDs to the network and receive configuration of Sidelink Buffer Status Report (SL BSR) for one or more of the indicated IDs from the network.

For example, the ID may be one of a PC5-RRC connection, a direct link with the other UE, a Link ID, a Source ID and a Destination ID.

In step 1602, if one or more logical channels having data available for transmission are associated with one of the indicated IDs and if the SL BSR configuration is configured for the ID, the UE may trigger a SL BSR which corresponds to the ID.

For example, the UE can trigger a Sidelink BSR only for the configured ID.

In step 1603, if the UE detects a failure on the sidelink transmission associated with the ID, if the SL grant(s) can accommodate all pending data available from all logical channels associated with the ID for SL transmission, or if the UE changes to UE autonomous resource allocation for the ID, the UE cancels all triggered SL BSRs, except triggered SL BSRs not associated with the ID.

For example, the failure on the sidelink transmission may occur when the sidelink transmission cannot meet QoS requirement related to the ID, when the direct link related to the ID is released, or when a failure is detected on the direct link related to the ID.

Figure 17:
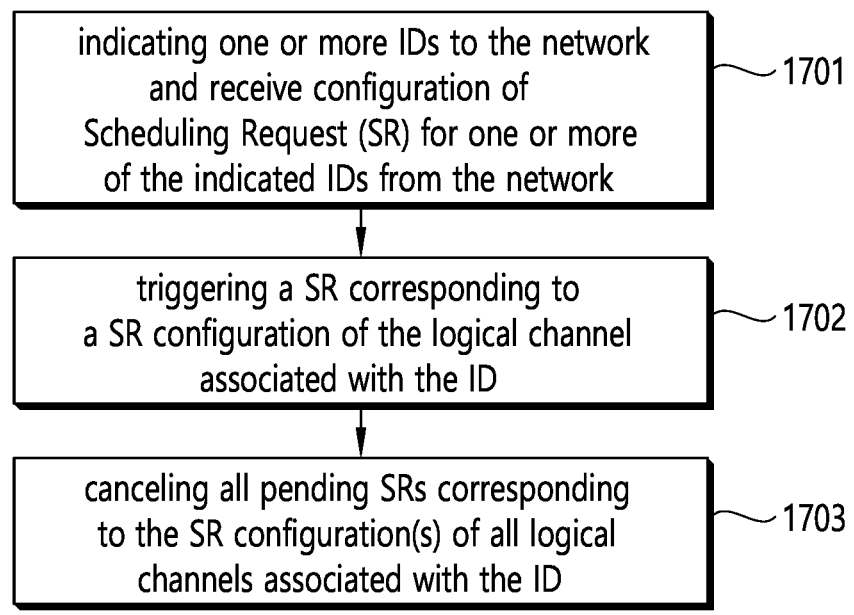
FIG. 17 shows another example of a method for control SL BSR based on different direct links in sidelink communication system, according to some embodiments of the present disclosure.

FIG. 17 shows another example of a method for control SL BSR based on different direct links in sidelink communication system, according to some embodiments of the present disclosure. In particular, FIG. 17 shows an example of method for performing sidelink communication for a UE.

In step 1701, for different sidelink transmissions with different IDs, the UE may indicate one or more IDs to the network and receive configuration of Scheduling Request (SR) for one or more of the indicated IDs from the network.

For example, the ID may be one of a PC5-RRC connection, a direct link with the other UE for unicast, a Link Identifier (Link ID), a Source ID and a Destination ID.

In step 1702, if a SL BSR is triggered for a logical channel associated with the ID and a UL grant is not available for the SL BSR, the UE may trigger a SR corresponding to a SR configuration of the logical channel associated with the ID.

For example, the SR may be considered as pending.

In step 1703, if the UE detects a failure on the sidelink transmission associated with the ID, if the SL grant(s) can accommodate all pending data available from all logical channels associated with the ID for SL transmission, or if the UE changes to UE autonomous resource allocation for the ID, the UE may cancel all pending SRs corresponding to the SR configuration(s) of all logical channels associated with the ID.

For example, the failure on the sidelink transmission may occur when the sidelink transmission cannot meet QoS requirement related to the ID, when the direct link related to the ID is released, or when a failure is detected on the direct link related to the ID.

In this case, the UE may also stop sr-ProhibitTimer for the SR configuration(s) of all logical channels associated with the ID.

Figure 18:
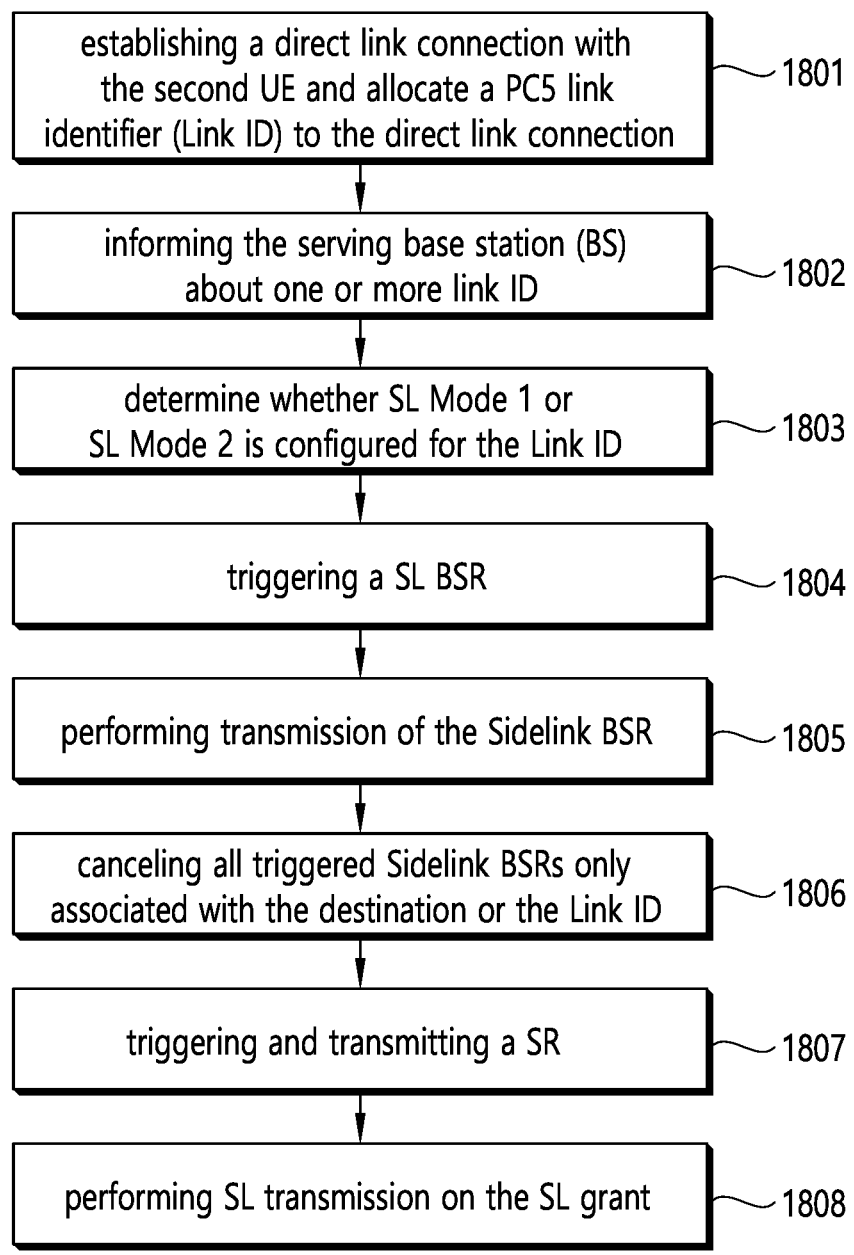
FIG. 18 shows another example of a method for control SL BSR based on different direct links in sidelink communication system, according to some embodiments of the present disclosure.

FIG. 18 shows another example of a method for control SL BSR based on different direct links in sidelink communication system, according to some embodiments of the present disclosure. In particular, FIG. 18 shows an example of method performed by a first UE and a serving BS.

In step 1801, the first UE may establish a direct link connection with the second UE and allocate a PC5 link identifier (Link ID) to the direct link connection. If the direct link is established for unicast type of sidelink communication, the first UE may indicate the allocated Link ID to the second UE.

For example, if the first UE may establish another direct link connection with the third UE, the first UE may allocate another Link ID to another direct link connection with the third UE.

The PC5 Link Identifier may be a unique value within the UE.

For example, the Link ID may be associated with one or more Destination IDs or one or more services used by the first UE.

In step 1802, the first UE may inform the serving base station (BS) about one or more link ID.

For example, the UE may also inform the base station about one or more traffic patterns associated with each of the indicated Link ID. Each traffic pattern may be mapped to each LCID (Logical Channel ID), each Sidelink Radio Bearer (SLRB) or each QoS value (for example, PQI value) of the indicated Link ID.

In step 1803, upon receiving the information from the first UE, the serving BS may determine whether SL Mode 1 (in other words, BS controlled resource allocation) or SL Mode 2 (in other words, UE autonomous resource allocation) is configured for the Link ID.

If SL Mode 1 is configured, the BS may configure a Sidelink Buffer Status Report (SL BSR) for the first UE.

For example, in this configuration, the Link IDs indicated by the first UE may be allocated with Link Indexes. One or more Link IDs may be mapped to one Link Index.

For example, one or more sidelink logical channels may be mapped to one Link ID.

In Step 1804, if data is available for transmission among sidelink logical channels associated with the Link ID for the direct link connection, the UE may trigger a SL BSR. The SL BSR may indicate the Link Index mapped to the Link ID and the amount of sidelink data available for transmission in the SL buffers for the Link ID.

For example, for PC5 sidelink transmission, the SL BSR may include one or more sets of a Link Index, one or more Logical Channel Group (LCG), and one or more Buffer Sizes for different LCGs. Namely, Destination Index may be replaced by Link Index for unicast.

Alternatively, the SL BSR may include one or more sets of a Link Index, one or more Destination Index, one or more Logical Channel Group (LCG) for different Destination Index, and one or more Buffer Sizes for different LCGs.

For example, for PC5 groupcast or broadcast transmission, the SL BSR may include one or more sets of a Destination Index, one or more Logical Channel Group (LCG), and one or more Buffer Sizes for different LCGs. The Destination Index may be mapped to one or more Destination IDs.

Based on Step 1804, SL BSR can be triggered as the following table 5.

TABLE 57

RRC controls BSR reporting for the sidelink by configuring the two timers periodic-BSR-TimerSL and retx-BSR-TimerSL. In this case, the first UE triggers a SL BSR for all destinations and link identifiers used by the first UE, if a condition is met. The SL BSR includes SL Buffer Sizes for multiple Destination IDs and/or multiple Link IDs. Alternatively, RRC controls BSR reporting for the sidelink by configuring the two timers periodic-BSR-TimerSL and retx-BSR-TimerSL for all or some logical channels of each Destination ID or for all or some logical channels of each Link ID. In this case, the UE triggers a SL BSR for the logical channels of each Destination ID or each Link ID, if a condition is met. The timers run for each Destination ID or each Link ID. The SL BSR includes SL Buffer Sizes only for the Destination ID or the Link ID.
Each parameter value is associated with each priority or each QoS parameter value (e.g. PQI value). The first UE uses the timer value of a priority or a QoS parameter value associated with the highest priority or the highest (or the lowest) QoS parameter value of logical channels associated with a Destination or a Link ID.
In details, the UE triggers a SL BSR, if any of the following events occur:
SL data, for a sidelink logical channel of the Link ID, becomes available for transmission in the RLC entity or in the PDCP entity (the definition of what data shall be considered as available for transmission is described above respectively) and either the data belongs to a sidelink logical channel with higher priority than the priorities of the sidelink logical channels which belong to any LCG belonging to the same Link ID and for which data is already available for transmission, or there is currently no data available for transmission for any of the sidelink logical channels belonging to the same
Link ID, in which case the Sidelink BSR is referred below to as "Regular Sidelink BSR";
UL resources are allocated and number of padding bits remaining after a Padding BSR has been triggered is equal to or larger than the size of the Sidelink BSR MAC control element containing the buffer status for at least one LCG of a Link ID plus its subheader, in which case the Sidelink BSR is referred below to as "Padding Sidelink BSR";
retx-BSR-TimerSL expires and the MAC entity has data available for transmission for any of the sidelink logical channels, in which case the Sidelink BSR is referred below to as "Regular Sidelink BSR";
periodic-BSR-TimerSL expires, in which case the Sidelink BSR is referred below to as "Periodic Sidelink BSR";
An SL-RNTI or an SL-V-RNTI is configured by upper layers and SL data is available for transmission in the RLC entity or in the PDCP entity (the definition of what data shall be considered as available for transmission is described above respectively), in which case the Sidelink BSR is referred below to as "Regular Sidelink BSR".
If the Buffer Status reporting procedure determines that at least one Sidelink BSR has been triggered and not cancelled,
if the MAC entity has UL resources allocated for new transmission for this TTI and the allocated UL resources can accommodate a Sidelink BSR MAC control element plus its subheader as a result of logical channel prioritization:
the UE shall instruct the Multiplexing and Assembly procedure to generate the Sidelink BSR MAC control element(s);
the UE shall start or restart periodic-BSR-TimerSL except when all the generated Sidelink BSRs are Truncated Sidelink BSRs;
the UE shall start or restart retx-BSR-TimerSL;
else if a Regular Sidelink BSR has been triggered:
if an uplink grant is not configured, the Scheduling Request shall be triggered.

In step 1805, the first UE may perform transmission of the Sidelink BSR. For example, a MAC PDU may contain at most one Sidelink BSR MAC control element for a destination or a Link ID, even when multiple events trigger a Sidelink BSR associated with the destination or the Link ID by the time a Sidelink BSR can be transmitted. For example, the Regular Sidelink BSR and the Periodic Sidelink BSR may have precedence over the padding Sidelink BSR. The Sidelink BSR associated with the Link ID may have precedence over the Sidelink BSR associated with the destination. The Sidelink BSR associated with unicast transmission may have precedence over the Sidelink BSR associated with groupcast transmission or broadcast transmission. The Sidelink BSR associated with groupcast transmission may have precedence over the Sidelink BSR associated with broadcast transmission.

The network or the first UE may allocate a priority of the link ID. The priority of the link ID can be the highest priority of sidelink logical channels associated with the link ID, for example, based on QFI and/or QoS parameter value such as PQI.

Different priorities can be configured for different link IDs. If allocated, when multiple events trigger a Sidelink BSR associated with a destination or a Link ID by the time a Sidelink BSR can be transmitted, the Sidelink BSR associated with the highest priority of the link ID or the highest priority of sidelink logical channels associated with the link ID or the destination ID may have precedence over the other Sidelink BSRs.

In addition, the Sidelink BSR associated with a Link ID may have precedence over the Sidelink BSR associated with a destination. The Sidelink BSR associated with unicast transmission may have precedence over the Sidelink BSR associated with groupcast transmission or broadcast transmission. The Sidelink BSR associated with groupcast transmission may have precedence over the Sidelink BSR associated with broadcast transmission.

The MAC entity may restart retx-BSR-TimerSL associated with a destination or a Link ID upon reception of an SL grant associated with the destination or the Link ID.

The MAC entity may transmit at most one Regular and/or Periodic Sidelink BSR in a TTI. If the MAC entity is requested to transmit multiple MAC PDUs in a TTI, it may include a padding Sidelink BSR in any of the MAC PDUs which do not contain a Regular and/or Periodic Sidelink BSR.

All Sidelink BSRs transmitted in a TTI always reflect the buffer status for a destination or a Link ID after all MAC PDUs have been built for this TTI. Each LCG may report at the most one buffer status value per TTI and this value may be reported in all Sidelink BSRs reporting buffer status for this LCG.

A Padding Sidelink BSR may be not allowed to cancel a triggered Regular and/or Periodic Sidelink BSR. A Padding Sidelink BSR may be triggered for a specific MAC PDU only and the trigger may be cancelled when this MAC PDU has been built.

In step 1806, in the first UE, all triggered Sidelink BSRs only associated with the destination or the Link ID may be cancelled.

For example, all triggered Sidelink BSRs only associated with the destination or the Link ID may be cancelled, when the serving BS reconfigures SL transmission from SL Mode 1 (BS controlled resource allocation) to SL Mode 2 (UE autonomous resource allocation) for the destination or the Link ID to the first UE.

For example, all triggered Sidelink BSRs only associated with the destination or the Link ID may be cancelled, when the direct link connection associated with the destination or the Link ID is released.

For example, all triggered Sidelink BSRs only associated with the destination or the Link ID may be cancelled, when the first UE detects link failure on the direct link connection.

For example, all triggered Sidelink BSRs only associated with the destination or the Link ID may be cancelled, when the first UE receives link failure information from the second UE. For example, if the second UE informs the first UE about the link failure information indicating RLF, retransmission failure, security failure or reconfiguration failure based on transmission from the first UE, all triggered Sidelink BSRs only associated with the destination or the Link ID may be cancelled, For example, all triggered Sidelink BSRs only associated with the destination or the Link ID may be cancelled, when the first UE detects that QoS requirement cannot be guaranteed for the destination nor the link ID. For example, the QoS requirement may include one of a target data rate, a target delay, a target communication range, and a target reliability for the destination or the link ID.

For example, all triggered Sidelink BSRs only associated with the destination or the Link ID may be cancelled, when a quality of the direct link (for example, based on CBR measurement in the first UE, or CQI report, or based on SL-RSRP or SL-RSRQ measurement report from the second UE) on the direct link is lower than a threshold.

For example, all triggered Sidelink BSRs only associated with the destination or the Link ID may be cancelled, when the first UE cannot detect transmission from any receiving UE for the destination or the link ID.

For example, all triggered Sidelink BSRs only associated with the destination or the Link ID may be cancelled, when the MAC entity has no data available for transmission for any of the sidelink logical channels associated with the destination or the Link ID.

For example, all triggered Sidelink BSRs only associated with the destination or the Link ID may be cancelled, when a Sidelink BSR associated with the destination or the Link ID (except for Truncated Sidelink BSR) is included in a MAC PDU for UL transmission.

For example, all triggered Sidelink BSRs only associated with the destination or the Link ID may be cancelled, when the remaining configured SL grant(s) valid for the destination or the Link ID can accommodate all pending data available for SL transmission associated with the destination or the Link ID.

For example, all triggered Sidelink BSRs only associated with the destination or the Link ID may be cancelled, when the UE changes a PCell or a PSCell, for example, due to handover or cell selection.

All triggered Sidelink BSRs only associated with the destination or the Link ID may be cancelled, and retx-BSR-TimerSL and periodic-BSR-TimerSL may be stopped for the destination or the Link ID, when the serving BS configures autonomous resource selection for the destination or the Link ID.

Alternatively, all triggered Sidelink BSRs only associated with a logical channel of the destination or the Link ID may be cancelled, and retx-BSR-TimerSL and periodic-BSR-TimerSL may be stopped for a logical channel of the destination or the Link ID, when the serving BS configures autonomous resource selection for a logical channel of the destination or the Link ID.

In step 1807, if the SR is triggered in Step 1804, the UE may trigger and transmit a SR.

For example, the Scheduling Request (SR) may be used for requesting SCI resources, SL-SCH resources and SL HARQ feedback resources for new transmission as well as retransmissions.

For example, the MAC entity may be configured with zero, one, or more SR configurations for a destination or a link ID. An SR configuration may consist of a set of PUCCH resources for SR across different BWPs and cells. For a sidelink logical channel, at most one PUCCH resource for SR is configured per BWP.

In step 1808, upon receiving a SL grant for the destination or the Link ID, the first UE may perform SL transmission on the SL grant.

Figure 19:
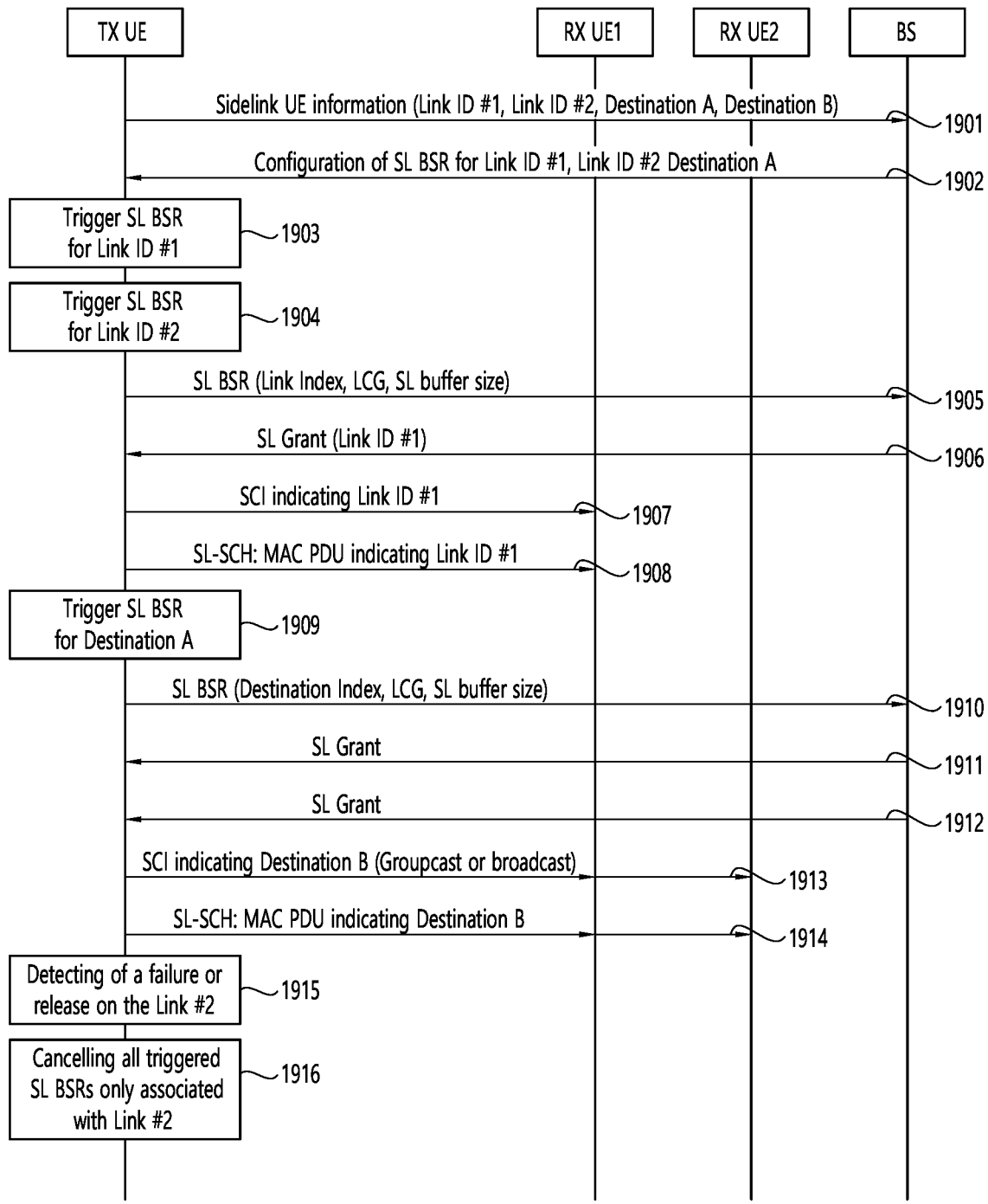
FIG. 19 shows an example of a method for control SL BSR based on different direct links in sidelink communication system, according to some embodiments of the present disclosure.

FIG. 19 shows an example of a method for control SL BSR based on different direct links in sidelink communication system, according to some embodiments of the present disclosure. In particular, FIG. 19 shows an example of method for reporting SL Buffer Status Reports, to a BS, performed by a TX UE related to a RX UE1 and a RX UE2.

In step 1901, the TX UE may transmit, to the BS, sidelink UE information of the TX UE. For example, the sidelink UE information may include link ID #1, link ID #2, destination A, and destination B.

In step 1902, the TX UE may receive, from the BS, configuration of SL BSR for the link ID #1, the link ID #2, and the destination A.

In step 1903, the TX UE may trigger SL BSR for the link ID #1.

In step 1904, the TX UE may trigger SL BSR for the link ID #2.

In step 1905, the TX UE may transmit, to the BS, the SL BSR including link index, LCG, and SL buffer size.

In step 1906, the TX UE may receive, from the BS, SL grant associated with the link ID #1.

In step 1907, the TX UE may transmit, to the RX UE1, SCI indicating link ID #1.

In step 1908, the TX UE may transmit MAC PDU indicating the link ID #1 via SL-SCH.

In step 1909, the TX UE may trigger SL BSR for the destination A.

In step 1910, the TX UE may transmit, to the BS, SL BSR including destination index, LCG, and SL buffer size.

In step 1911 and step 1912, the TX UE may receive SL grant.

In step 1913, the TX UE may transmit, to the RX UE1 and the RX UE2, SCI indicating destination B (for example, groupcast or broadcast).

In step 1914, the TX UE may transmit, to the RX UE1 and the RX UE2, MAC PDU indicating destination B via SL-SCH.

In step 1915, the TX UE may detect a failure on the link ID #2 and release on the link ID #2.

In step 1916, the TX UE may cancel all triggered SL BSRs only related associated with the link ID #2.

Sidelink resource allocation is described in detail. If the TX UE is in RRC_CONNECTED and configured for the BS (for example, gNB) scheduled sidelink resource allocation, the TX UE may transmit Sidelink UE Information including Traffic Pattern of Service, TX carriers and/or RX carriers mapped to Service, QoS information related to Service (e.g. 5QI, PPPP, PPPR, QCI value), and Destination related to Service After receiving Sidelink UE Information, gNB may construct Sidelink Configuration at least including one or more resource pools for Service and Sidelink BSR configuration. gNB may signal the Sidelink Configuration to the TX UE and then the TX UE may configure lower layers with Sidelink Configuration.

If a message becomes available in L2 buffer for sidelink transmission, the TX UE may trigger Scheduling Request (SR), so that the TX UE transmits PUCCH resource. If PUCCH resource is not configured, the TX UE may perform random access procedure as the Scheduling Request. If an uplink grant is given at a result of the SR, the TX UE may transmit Sidelink Buffer Status Report (SL BSR) to gNB. The Sidelink Buffer Status Report indicates at least a Destination index, a LCG, and a buffer size corresponding to the destination.

After receiving the SL BSR, gNB may transmit a sidelink grant to the TX UE for example by sending Downlink Control Information (DCI) in PDCCH. The DCI may include an allocated sidelink resource. If the TX UE receives the DCI, the TX UE may use the sidelink grant for transmission to the RX UE.

The present disclosure can have various advantageous effects.

According to some embodiments of the present disclosure described with reference to FIGS. 15 to 19, a wireless device could control SL BSR efficiently in sidelink communication system.

For example, a wireless device may cancel all triggered SL BSRs only associated with a single direct link in a certain condition.

For example, a wireless device may avoid unnecessary transmission of SL BSR. In particular when the wireless device has several direct links with several other wireless devices and detects a problem on one of the direct links, the wireless device may avoid unnecessary transmission of SL BSR.

For example, a wireless device could cancel the triggered SL BSRs only related to a specific link with a specific UE or specific UEs not to effect the other triggered SL BSRs related to the other direct link with another UE or the other UEs.

For example, a wireless device could perform sidelink transmission to several other wireless devices efficiently by allocating SL resources.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a first wireless device in a wireless communication system, the method comprising,
    receiving, from a network, a sidelink (SL) buffer status reporting (BSR) configuration;
    triggering a first SL BSR, based on first SL data becoming available for a first logical channel related to a first destination, wherein the first logical channel is related to a first PC5-Radio Resource Control (RRC) connection between a pair of a source and the first destination;
    triggering a second SL BSR, based on second SL data becoming available for a second logical channel related to a second destination, wherein the second logical channel is related to a second PC5-RRC connection between a pair of the source and the second destination;
    detecting a failure on a sidelink associated with the first destination;
    canceling one or more SL BSRs only associated with the first PC5-RRC connection based on the failure on the sidelink associated with the first destination, wherein the first SL BSR is included in the canceled one or more SL BSRs; and
    transmitting, to the network, the second SL BSR based on that the second SL BSR has been triggered and not canceled.

2. The method of claim 1, wherein the detecting a failure on the sidelink further comprises:
    detecting that the sidelink associated with the first destination does not meet a quality of service (QoS) requirement.

3. The method of claim 2, wherein the QoS requirement includes a target data rate, a target delay, a target communication range, and/or a target reliability.

4. The method of claim 1, wherein the detecting the failure on the sidelink further comprises:
    detecting that the sidelink associated with the first destination is released.

5. The method of claim 1, wherein the detecting the failure on the sidelink further comprises:
    receiving link failure information via the sidelink associated with the first destination.

6. The method of claim 5, wherein the link failure information indicates radio link failure (RLF), retransmission failure, security failure, and/or reconfiguration failure based on transmission from the first wireless device.

7. The method of claim 1, wherein the method further comprises:

triggering a scheduling request (SR) based on that an uplink (UL) grant for the second SL BSR is not available.

8. The method of claim 7, wherein the method further comprises:
canceling the triggered SR based on detecting a failure on a sidelink associated with the second destination.

9. The method of claim 1, wherein the method further comprises:
establishing the first PC5-RRC connection with a second wireless device.

10. The method of claim 1, wherein the first wireless device is in communication with at least one of a user equipment, a network, or an autonomous vehicle other than the first wireless device.

11. The method of claim 9, wherein the method further comprises:
establishing a second PC5-RRC connection with a third wireless device, wherein the second destination corresponds to the second PC5-RRC connection.

12. A first wireless device in a wireless communication system comprising: a transceiver; a memory; and at least one processor operatively coupled to the transceiver and the memory, and configured to:
receive, from a network, a sidelink (SL) buffer status reporting (BSR) configuration;
trigger a first SL BSR, based on first SL data becoming available for a first logical channel related to a first destination, wherein the first logical channel is related to a first PC5-Radio Resource Control (RRC) connection between a pair of a source and the first destination:
trigger a second SL BSR, based on second SL data becoming available for a second logical channel related to a second destination, wherein the second logical channel is related to a second PC5-RRC connection between a pair of the source and the second destination;
detect a failure on a sidelink associated with the first destination;
cancel one or more SL BSRs only associated with the first PC5-RRC connection based on the failure on the sidelink associated with the first destination, wherein the first SL BSR is included in the canceled one or more SL BSRs; and
transmit, to the network, the second SL BSR based on that the second SL BSR has been triggered and not canceled.

13. A non-transitory computer-readable medium having stored thereon a plurality of instructions, which, when executed by a processor of a wireless device, cause the wireless device to:
receive, from a network, a sidelink (SL) buffer status reporting (BSR) configuration;
trigger a first SL BSR, based on first SL data becoming available for a first logical channel related to a first destination, wherein the first logical channel is related to a first PC5-Radio Resource Control (RRC) connection between a pair of a source and the first destination;
trigger a second SL BSR, based on second SL data becoming available for a second logical channel related to a second destination, wherein the second logical channel is related to a second PC5-RRC connection between a pair of the source and the second destination;
detect a failure on a sidelink associated with the first destination;
cancel one or more SL BSRs only associated with the first PC5-RRC connection based on the failure on the sidelink associated with the first destination, wherein the first SL BSR is included in the canceled one or more SL BSRs; and
transmit, to the network, the second SL BSR based on that the second SL BSR has been triggered and not canceled.

* * * * *